(12) United States Patent
Kurita

(10) Patent No.: US 10,382,575 B2
(45) Date of Patent: Aug. 13, 2019

(54) PROGRAM EXECUTION SYSTEM, METHOD OF EXECUTING PROGRAM, AND COMPUTER-READABLE STORAGE MEDIUM

(71) Applicant: NEC CORPORATION, Tokyo (JP)

(72) Inventor: Takeshi Kurita, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 346 days.

(21) Appl. No.: 15/367,352

(22) Filed: Dec. 2, 2016

(65) Prior Publication Data

US 2017/0171340 A1 Jun. 15, 2017

(30) Foreign Application Priority Data

Dec. 9, 2015 (JP) ................................. 2015-240338

(51) Int. Cl.

| | |
|---|---|
| H04L 29/06 | (2006.01) |
| H04L 29/08 | (2006.01) |
| G06F 9/50 | (2006.01) |
| H04W 52/02 | (2009.01) |

(52) U.S. Cl.
CPC .............. *H04L 67/28* (2013.01); *G06F 9/50* (2013.01); *H04L 67/2819* (2013.01); *H04L 67/10* (2013.01); *H04L 67/42* (2013.01); *H04W 52/0209* (2013.01); *Y02D 70/142* (2018.01); *Y02D 70/144* (2018.01); *Y02D 70/164* (2018.01); *Y02D 70/166* (2018.01); *Y02D 70/26* (2018.01)

(58) Field of Classification Search
CPC ........................ H04L 67/2819; H04L 63/0884
USPC ............................ 709/203, 205, 219, 231, 246
See application file for complete search history.

(56) References Cited

U.S. PATENT DOCUMENTS

| | | | | |
|---|---|---|---|---|
| 9,704,327 | B2* | 7/2017 | Vawter | .................. G06Q 20/00 |
| 2010/0274626 | A1* | 10/2010 | Carlson | .................. G06Q 20/12 |
| | | | | 705/14.58 |

FOREIGN PATENT DOCUMENTS

| | | |
|---|---|---|
| JP | 2000-122871 A | 4/2000 |
| JP | 5529027 B2 | 6/2014 |

OTHER PUBLICATIONS

"Balancing Security in the Cloud with Reality of HCE Today"—Michael Gargiulo, TNG Technologies, Jun. 2014 https://www.securetechalliance.org/secure/events/20140602/gargiulom.pdf.*

* cited by examiner

*Primary Examiner* — Randy A Scott
(74) *Attorney, Agent, or Firm* — Sughrue Mion, PLLC

(57) ABSTRACT

Disclosed is a program execution system for suppressing consumption of a CPU resource and a battery of a user terminal such as a smart terminal. The program execution system includes: a client device determines whether a program started up is to be executed by the client device or another device and transmits a first execution request to which state information on the client device is added, to a proxy server when it is determined that the program is to be executed by another device; the proxy server receives the first execution request and determines whether the program is to be executed by the proxy server or another device and transmits a second execution request to a cloud server when it is determined that the program is to be executed by another device; and the cloud server receives the second execution request and executes the program.

20 Claims, 17 Drawing Sheets

Fig.3

| 104 TERMINAL STATE MANAGEMENT TABLE | | | |
|---|---|---|---|
| OPERATION STATE | WORN STATE | MOVEMENT | RADIO WAVE |
| No | Yes | Yes | Yes |

Fig.5

202 CLIENT MANAGEMENT TABLE

| CLIENT | ID | SPECIFICATION | PROXY EXECUTION ENVIRONMENT |
|---|---|---|---|
| Client1 | 000001 | CPU:Z1<br>MEMORY:100MB<br>CHANNEL:1Mbps | VM1 |
| Client2 | 000002 | CPU:Z2<br>MEMORY:40MB<br>CHANNEL:432.6kbps | VM2 |
| Client3 | 000003 | CPU:Z2<br>MEMORY:60MB<br>CHANNEL:1Mbps | VM3 |
| ... | ... | ... | ... |

Fig.6

203 CLOUD MANAGEMENT TABLE

| REGISTRATION NUMBER | ADDRESS INFORMATION | CLIENT LIST | CONNECTION STATE |
|---|---|---|---|
| 000201 | 10. xx. xx. 34 | Client1, Client2, Client3, ... | OK |
| 000202 | 31. xx. xx. 59 | Client1, Client2, Client3, ... | OK |
| 000203 | 10. xx. xx. 42 | Client1, Client2, Client3, ... | NG |
| 000204 | 106. xx. xx. 30 | Client1, Client2, Client3, ... | OK |
| ... | ... | ... | |

Fig. 7

206 PROGRAM MANAGEMENT TABLE

| REGISTRATION NUMBER | PROGRAM | SIZE | I/O PRESENCE OR ABSENCE |
|---|---|---|---|
| 00080001 | A | 37.07KB | PRESENCE |
| 00080002 | B | 184.41KB | ABSENCE |
| 00080003 | C | 48.10KB | PRESENCE |
| ... | ... | ... | ... |

Fig.8

| REGISTRATION NUMBER | CLIENT ID | PROXY SERVER ID | PROXY EXECUTION ENVIRONMENT |
|---|---|---|---|
| 00040001 | 0000001 | 01000001 | VM1 |
| 00040002 | 0000002 | 01000002 | VM2 |
| 00040003 | 0000003 | 01000003 | VM3 |
| ... | ... | ... | ... |

302 PROXY EXECUTION ENVIRONMENT MANAGEMENT TABLE

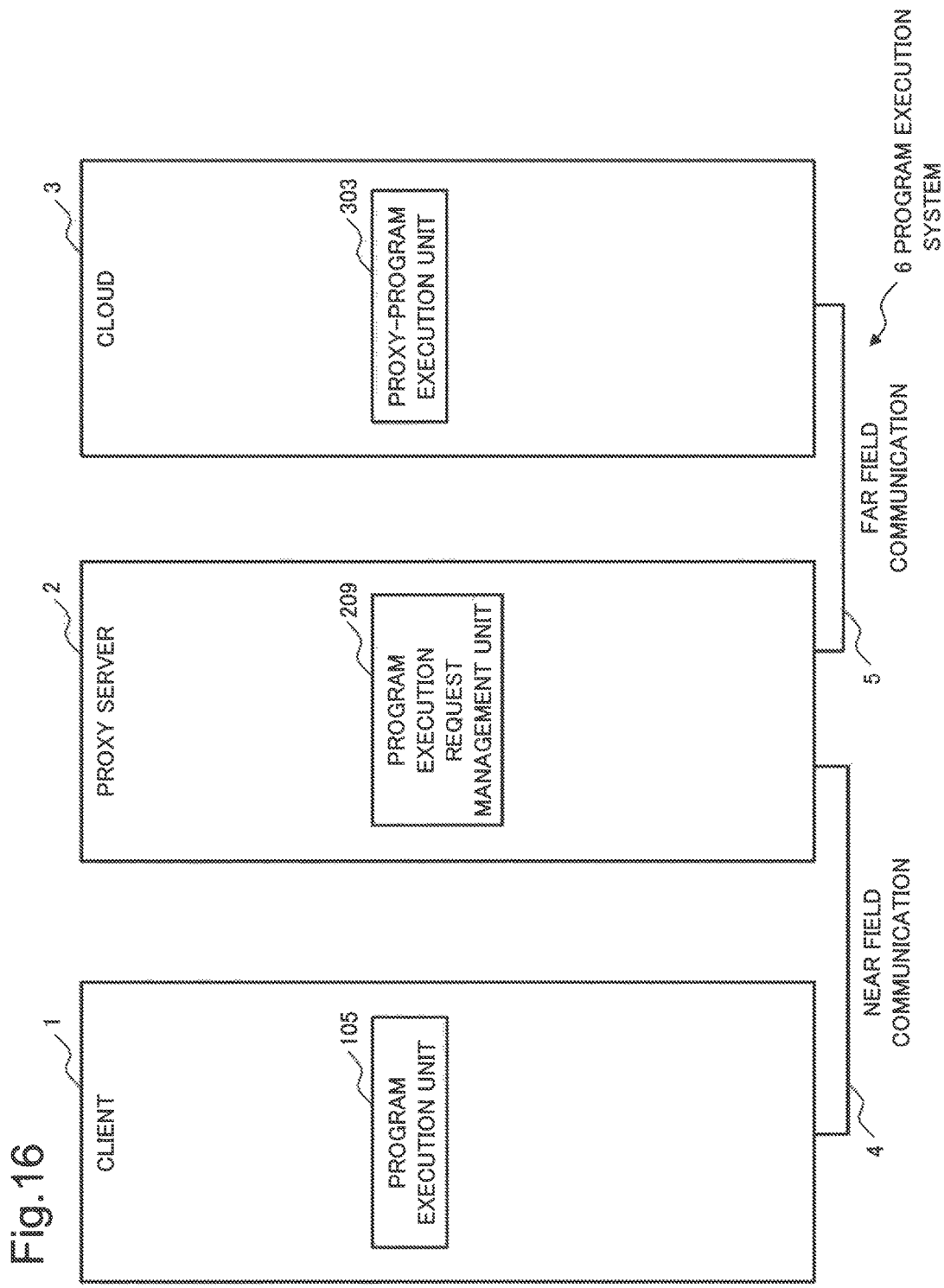

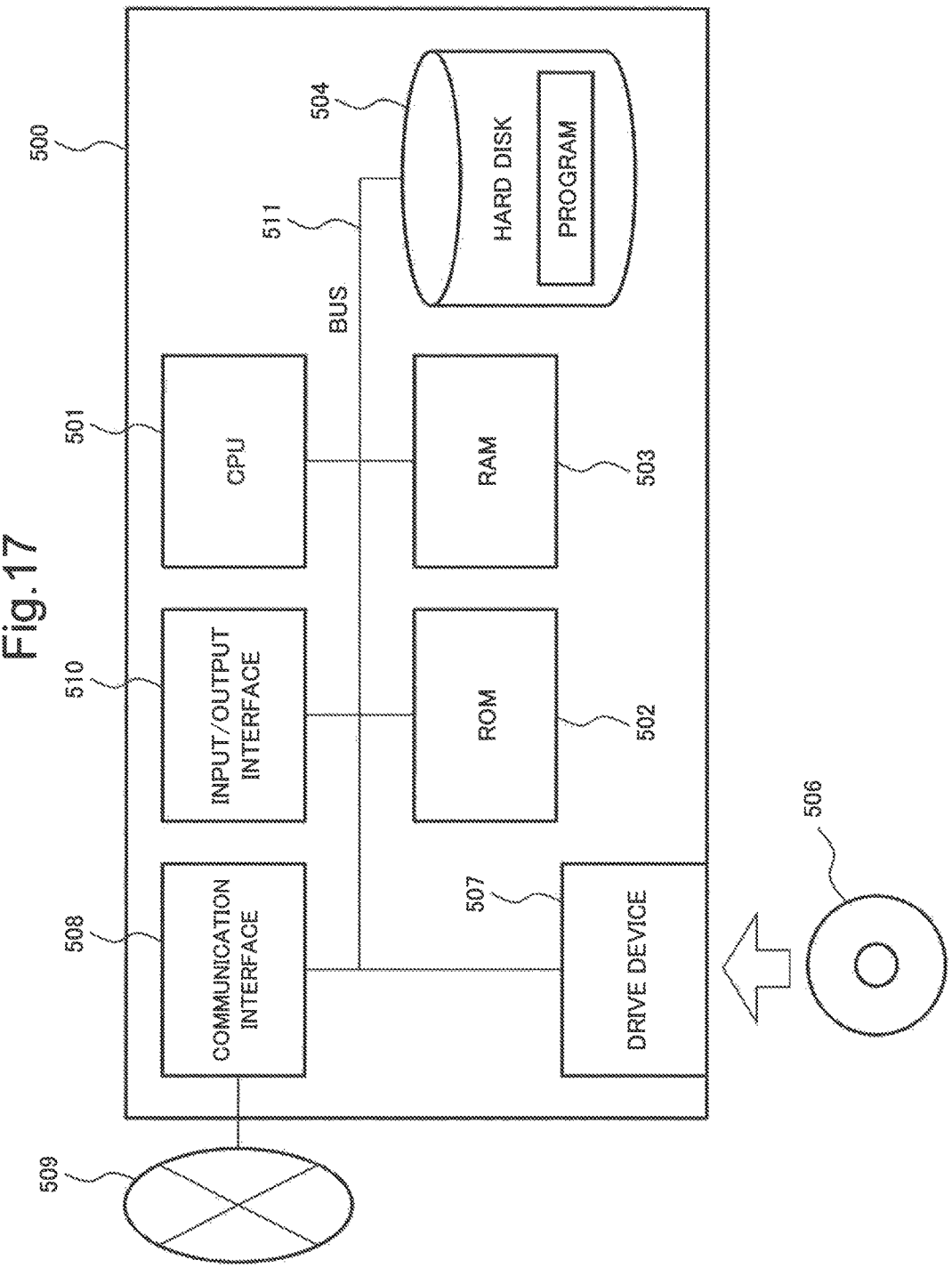

PROGRAM EXECUTION SYSTEM, METHOD OF EXECUTING PROGRAM, AND COMPUTER-READABLE STORAGE MEDIUM

This application is based upon and claims the benefit of priority from Japanese Patent Application No. 2015-240338, filed on Dec. 9, 2015, the disclosure of which is incorporated herein in its entirety by reference.

TECHNICAL FIELD

The present invention relates to a program execution system, a method of executing a program, and a computer-readable storage medium.

BACKGROUND ART

Compilation of a program or execution of a program with a large arithmetic quantity requires a very high cost, and execution of the program by using a wearable terminal (hereinafter referred to as a smart terminal), such as a watch-type terminal and a glasses-type terminal, rapidly consumes a CPU (central processing unit) resource and a battery. Meanwhile, execution of a program related to a user interface at a place other than a smart terminal deteriorates a response. Thus, execution of the program at an appropriate place is important.

A technical example for solving the problem described above is disclosed in Patent Document 1 (Japanese Laid-Open Patent Publication No. 2000-122871) and Patent Document 2 (Japanese Patent No. 5529027). In the technique disclosed in these documents, a program to be executed by a smart terminal is compiled in a server, and transmitted to the smart terminal. In the server, compilation corresponding to the smart terminal is executed.

While the system disclosed in each of the documents described above allows the server to execute compilation of the program, the compiled program itself is executed by the smart terminal. As a result, a CPU resource or a battery of the smart terminal is consumed for the program to be executed in a background.

It is an object of the present invention to provide a program execution system, a method of executing the program, and a computer-readable storage medium for storing the program, to solve the problem described above.

SUMMARY

A first aspect of the invention is directed to a program execution system. The system includes:

a client device including one or more processors acting as a program execution unit configured to determine whether a program started up is to be executed by the client device or another device, based on a state of the client device, and transmit a first execution request to which state information on the client device is added, to a proxy server connected through a near field communication when it is determined that the program is to be executed by another device;

the proxy server including one or more processors acting as an execution request management unit configured to receive the first execution request and determine whether the program is to be executed by the proxy server or another device, based on the added state information, and transmit a second execution request to a cloud server connected through a far field communication when it is determined that the program is to be executed by another device; and the cloud server including one or more processors acting as a second proxy execution unit configured to receive the second execution request and execute the program.

A second aspect of the invention is directed to a method of executing a program. The method includes the steps of:

transmitting a first execution request to which state information on the client device is added, to a proxy server connected through a near field communication when a client device determines whether a program started up is to be executed by the client device or another device, based on a state of the client device, and determines to execute the program in another device;

transmitting a second execution request to a cloud server connected through a far field communication when the proxy server receives the first execution request, determines whether the program is to be executed by the proxy server or another device, based on the added state information, and determines to execute the program in another device; and causing the cloud server to receive the second request to execute the program.

A third aspect of the invention is directed to a computer-readable storage medium for recording a program. The program includes:

a first program that causes a first computer to execute the steps of determining whether a program started up is to be executed by the first computer or another device, based on a state of the first computer, and transmitting a first execution request to which state information on the first computer is added, to a second computer connected through a near field communication when it is determined that the program is to be executed by another device;

a second program that causes the second computer to execute the steps of receiving the first execution request, determining whether the program is to be executed by the second computer or another device, based on the added state information, and transmitting a second execution request to a third computer connected through a far field communication when it is determined that the program is to be executed by another device; and a third program that causes the third computer to execute the steps of receiving the second execution request, and executing the program.

The program execution system according to the present invention selects a place of executing the program depending on usage of a client terminal to suppress consumption of a CPU resource and a battery of a smart terminal used by a user.

BRIEF DESCRIPTION OF THE DRAWINGS

Exemplary features and advantages of the present invention will become apparent from the following detailed description when taken with the accompanying drawings in which:

FIG. 3 illustrates an example of a terminal state management table 104;

FIG. 5 illustrates an example of a client management table 202;

FIG. 6 illustrates an example of a cloud management table 203;

FIG. 7 illustrates an example of a program management table 206;

FIG. 8 illustrates an example of a proxy execution environment management table 302;

FIG. 16 is a block diagram of a program execution system 6 according to a second exemplary embodiment.

FIG. 17 is a block diagram of a hardware configuration according to exemplary embodiments.

EXEMPLARY EMBODIMENT

Next, a detailed explanation will be given for exemplary embodiments with reference to the drawings.

First Exemplary Embodiment

<Configuration and Operation of Each Unit>

Figure 1:
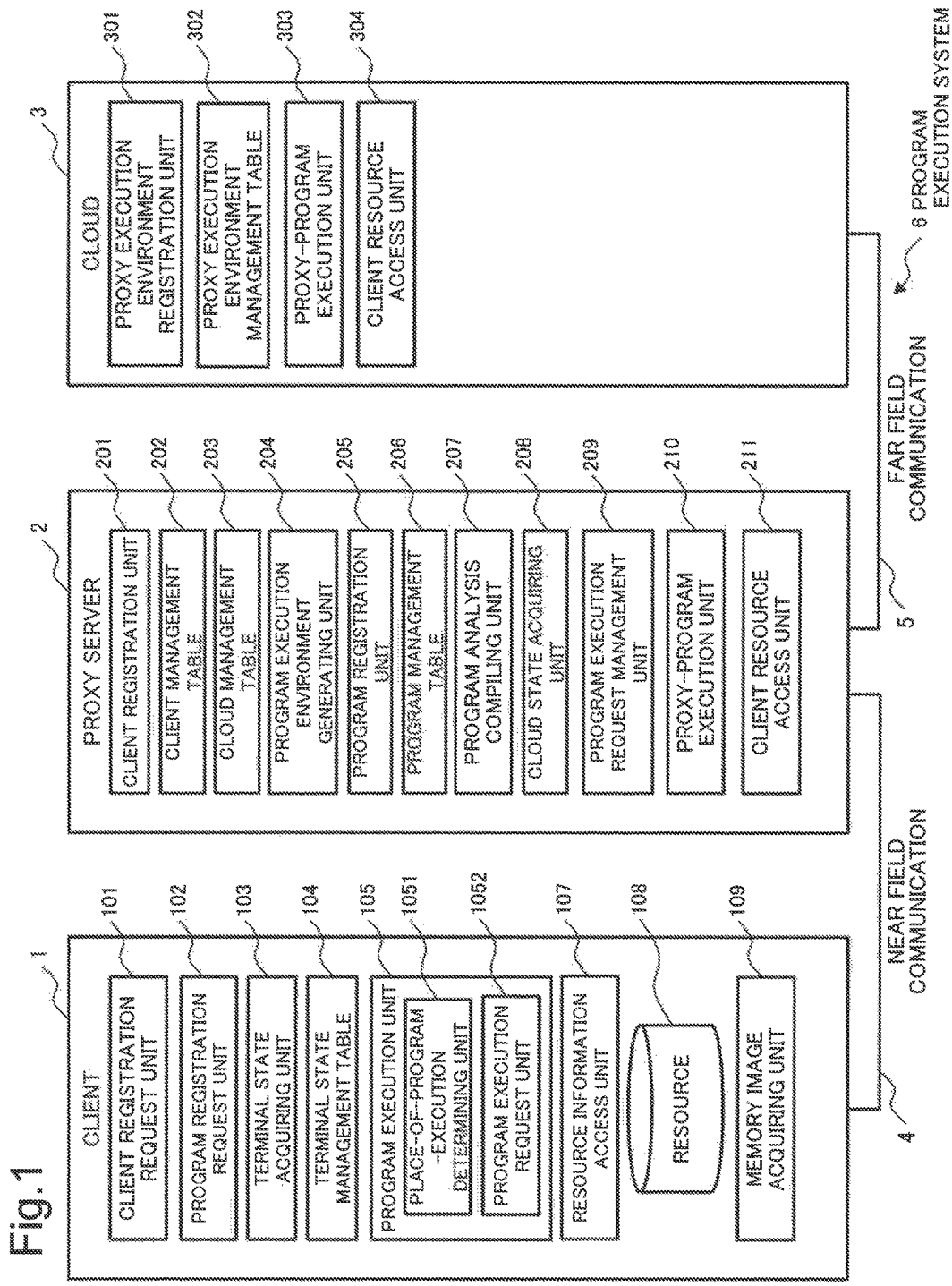
FIG. 1 is a block diagram of a program execution system 6 according to a first exemplary embodiment.

FIG. 1 is a block diagram of a program execution system 6 according to the present exemplary embodiment. The program execution system 6 includes one or more client devices (hereinafter referred to as a client 1), proxy servers (hereinafter referred to as a proxy server 2), and cloud servers (hereinafter referred to as a cloud 3) respectively.

The client 1 is a small-sized information terminal, such as smart glasses and a smartwatch, and has a small computational capability of a CPU (central processing unit) and a small storage capacity. The proxy server 2 is a mid-sized information terminal, such as a smartphone and a tablet terminal, and has a computational capability of a CPU and a storage capacity larger than those of the client 1. The cloud 3 has a computational capability of a CPU and a storage capacity larger than those of the client 1 and the proxy server 2. While the cloud 3 is a server, and the like, that belongs to a group of servers dispersedly disposed in a plurality of data centers, the cloud 3 may be one server installed in an office or the like.

One or more clients 1 are connected to one proxy server 2 through a near field communication 4. The near field communication 4, for example, is Bluetooth®. The client 1 and the proxy server 2 can communicate with each other at a low delay and a high speed through the near field communication 4. One or more proxy servers 2 and one or more clouds 3 are connected to each other through a far field communication 5. The far field communication 5, for example, is an internet communication network through an access point of a wireless LAN (local area network) that is located near the proxy server 2. The far field communication 5 causes a large delay to occur, as compared with the near field communication 4.

The client 1 includes each unit described below.

A client registration request unit 101 registers an identifier (hereinafter referred to as an ID (Identification)) of the client 1 itself, and specification information of the client 1 such as computational capability, storage capacity, and communication capability in the proxy server 2, when the client 1 first communicates with the proxy server 2 through the near field communication 4.

A program registration request unit 102 registers a program of the client 1 in the proxy server 2 at the first communication, or, when an additional program is installed, the program registration request unit 102 registers the program in the proxy server 2.

A terminal state acquiring unit 103 acquires terminal state information on the client 1 at regular intervals as to whether the client 1 is operating or not, whether the client 1 is worn by a user or not, whether the client 1 is moving or is stopped, and whether radio waves reach or not, and records the information in a terminal state management table 104. The terminal state acquiring unit 103, for example, determines that the client 1 is operating when there is a manipulated input from a touch panel or a microphone within a predetermined time, that the client 1 is worn when a body temperature of a human is reported from a thermal sensor, and that the client 1 is moving when a change in location is reported from the GPS (global positioning system).

The terminal state management table 104 is used to record state information acquired from the terminal state acquiring unit 103. FIG. 3 illustrates an example of the terminal state management table 104. In FIG. 3, the terminal state management table 104 is used to record whether the client 1 is operating (Yes) or not (No), whether the client 1 is worn (Yes) or not (No), whether the client 1 is moving (Yes) or is stopped (No), and whether radio waves can be received (Yes) or not (No).

When execution of a program is requested from a user operating the client 1 or an inside process of the client 1, a program execution unit 105 determines which of the client 1 or another device (the proxy server 2 or the cloud 3) is suitable to execute the program, and allows the client 1 to execute the program or requests the proxy server 2 to execute the program.

The program execution unit 105 includes a place-of-program-execution determining unit 1051, and a program execution request unit 1052.

The place-of-program-execution determining unit 1051 acquires a terminal state of the client 1 from the terminal state management table 104, and determines whether the program is to be executed by the client 1 or by another device in a remote execution environment, namely the proxy server 2 or the cloud 3, on the basis of the terminal state.

Figure 4:
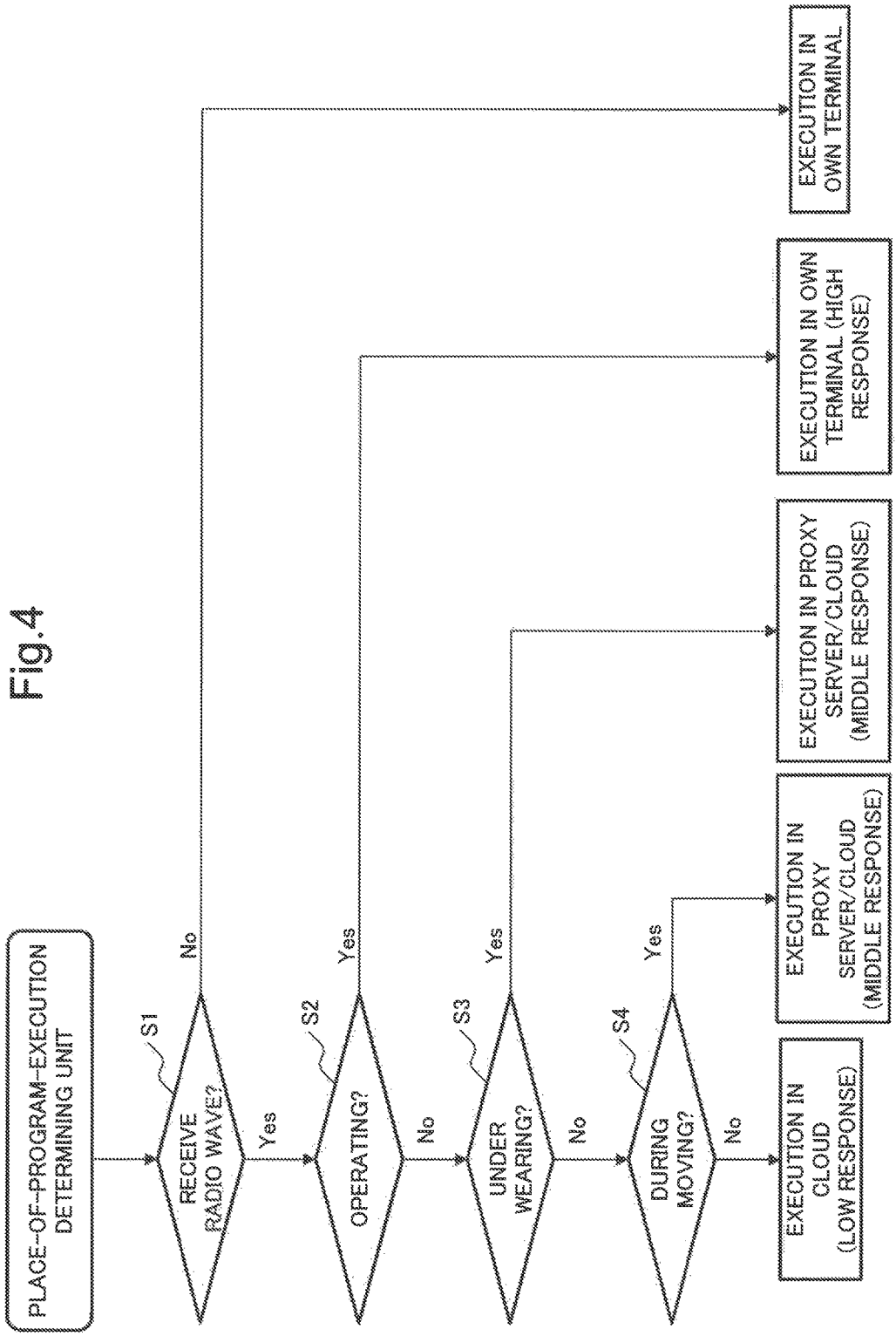
FIG. 4 is a flow chart of operation of a place-of-program-execution determining unit 1051.

FIG. 4 is a flow chart of operation of the place-of-program-execution determining unit 1051. The place-of-program-execution determining unit 1051 determines whether the client 1 can communicate with the proxy server 2 (S1), and when the client 1 cannot communicate therewith (No at S1), the place-of-program-execution determining unit 1051 determines that the program started up is to be executed by the client 1.

When the client 1 can communicate with the proxy server 2 (Yes at S1), the place-of-program-execution determining unit 1051 determines whether the client 1 is operating (S2). When the client 1 is operating (Yes at S2), the place-of-program-execution determining unit 1051, for example, determines that the program started up is related to a user interface and requires a high-speed responsiveness (a response in a shorter time with a high priority), thereby determining to execute the program by the client 1.

When the client 1 is not operating (No at S2), the place-of-program-execution determining unit 1051 determines whether the client 1 is worn by a user, or is moving (S3 and S4). When the client 1 is worn (Yes at S3), the place-of-program-execution determining unit 1051, for example, determines that the program started up requires a result within a relatively short time and requires a middle-speed responsiveness (a response in an average time), thereby determining to execute the program by the proxy server 2 or the cloud 3. Likewise, when the client 1 is not worn (No at S3), and is moving (Yes at S4), the place-of-program-execution determining unit 1051 determines in the same way. In this case, the proxy server 2 determines which of the proxy server 2 or the cloud 3 executes the program on the basis of the own processing capability, for example.

When the client 1 is not in any one of the states described above (No at S4), the client 1 is placed on a desk or the like, for example. In this case, the place-of-program-execution determining unit 1051, for example, determines that the program started up is started up by notification of a timer or a sensor, or by receiving a communication message, thereby determining that the program may be executed in a background without any problems. Then, the place-of-program-execution determining unit 1051 determines that the program allows even a low-speed responsiveness (a response in a longer time with a low priority), thereby determining to execute the program by the cloud 3.

When the place-of-program-execution determining unit 1051 determines to execute the program by another device, the program execution request unit 1052 transmits a program execution request to the proxy server 2.

The program execution request includes information on determination of the place-of-program-execution determining unit 1051, and information on a memory image. The program execution request may further include information used for allowing the proxy server 2 to determine a place of executing the program requiring the middle-speed responsiveness, such as an elapsed time from the last operation. In addition, the program execution request may include terminal state information such as what is stored in the terminal state management table 104, instead of the information on determination of the place-of-program-execution determining unit 1051. In this case, the proxy server 2 may determine as is the case with S3 or S4 of the place-of-program-execution determining unit 1051. The information on determination of the place-of-program-execution determining unit 1051 is information determined on the basis of state information of a terminal. In this sense, the information on determination of the place-of-program-execution determining unit 1051 and the terminal state information to be added to the program execution request are collectively referred to as state information.

A resource information access unit 107 accesses information of a resource 108. When the proxy server 2 issues a request to access the resource 108, the resource information access unit 107 returns the information of the resource 108. The resource information access unit 107 uses a publicly known art such as a virtual resource access method in a typical virtual file system (VFS).

The resource 108, for example, is file data or sensor data in the client 1.

A memory image acquiring unit 109 acquires images of all or a part of a memory in the client 1.

The proxy server 2 includes each unit described below.

A client registration unit 201 extracts an ID and specification information of the client 1 from the client registration request transmitted from the client registration request unit 101 of the client 1, and records the ID and the specification information in a client management table 202. In addition, the client registration unit 201 registers a virtual proxy execution environment generated by a program execution environment generating unit 204 in the client management table 202, and selects the cloud 3 from a cloud management table 203 to transmit the proxy execution environment to the cloud 3.

The client management table 202 is used to record a registration number, an ID, specification information, and the proxy execution environment of the client 1. FIG. 5 illustrates an example of the client management table 202. The proxy execution environment, for example, is a virtual machine (VM) configured to execute a program described in an intermediate language transmitted from the client 1 in the proxy server 2, and is virtual machine definition information for generating such a virtual machine in the cloud 3. The client management table 202 stores pointer information to the virtual machine and a file of the virtual machine definition information. When the client 1, the proxy server 2, and the cloud 3 have the same architecture, the virtual machine may execute a command of a common architecture. The proxy execution environment is generated so as to satisfy the specification information transmitted from the client 1.

The cloud management table 203 is used to record a registration number, address information, and a client list of the cloud 3. FIG. 6 illustrates an example of the cloud management table 203. The address information is an IP (internet protocol) address of the cloud 3. The client list is forwarded by the proxy server 2, and is a list of the client 1 executing the program in the cloud 3. A connection state indicates present communication availability.

The program execution environment generating unit 204 generates a virtual proxy execution environment from the specification information and the memory image of the client 1.

A program registration unit 205 allows a program analysis compiling unit 207 to analyze an intermediate code or a binary code of the program of the client 1 transmitted from the program registration request unit 102 of the client 1, and records an analyzed result in a program management table 206. When the program transmitted is a source, the program registration unit 205 allows the program analysis compiling unit 207 to compile the source program into an intermediate language or a binary code of a common architecture of the program execution system 6.

The program management table 206 is used to record a registration number of a program, an identifier of a file for storing an intermediate code or a binary type program, a size of a binary code, and presence or absence of I/O. FIG. 7 illustrates an example of the program management table 206.

The program analysis compiling unit 207 analyzes and compiles a source, a binary code, and an intermediate code of a program of the client 1, applies an identifier, and analyzes a size of the binary code, offset information in the binary code, and presence or absence of I/O.

A cloud state acquiring unit 208 checks connection to the cloud 3 at regular intervals, and records the result in a row of connection states in the cloud management table 203.

A program execution request management unit 209 acquires a requested program, state information, information on a memory image, an elapsed time from the last operation if added, and the like, from the program execution request transmitted from the program execution request unit 1052 of the client 1. Subsequently, the program execution request management unit 209 acquires a proxy execution environment of the requested client 1 from the client management table 202, and acquires the requested program from the program management table 206.

The program execution request management unit 209 requests a proxy-program execution unit 210 to execute the requested program in the proxy server 2 when the state information indicates a request of the middle-speed responsiveness, and returns a memory image acquired as a result of the execution of the program and operation information on the resource 108 to the client 1. When the state information indicates a request of a low-speed responsiveness, the program execution request management unit 209 transmits the memory image, the proxy execution environment, and the program to the cloud 3, and requests the cloud 3 to execute the program. Even when the state information indicates the request of the middle-speed responsiveness, the program execution request management unit 209 may allow the proxy server 2 to execute the requested program as far as the elapsed time from the last operation is within a certain time. A certain time is a value determined by the proxy server 2 on the basis of the own processing capability.

When the state information indicates the request of the middle-speed responsiveness, the program execution request management unit 209 may determine whether the program is to be executed by the proxy server 2 or in the cloud 3, based on the specification information in the client management table 202 or a load condition of the proxy server 2, and may request the proxy server 2 or the cloud 3 to execute the program.

When proxy execution of the program is requested from the program execution request management unit 209, the proxy-program execution unit 210 loads the requested program and the memory image of the client 1 into a virtual machine that is a proxy execution environment to execute the program, and acquires an image after the memory is changed to return the image to the program execution request management unit 209. When access to the resource 108 of the client 1 is required while the program is executed in the proxy execution environment, the program requests the client resource access unit 211 through the proxy execution environment to access the resource 108 of the client 1, and receives a result.

When access to the resource 108 of the client 1 is requested from the program executed by the proxy-program execution unit 210, the client resource access unit 211 requests the resource information access unit 107 of the client 1 to access the resource 108. In addition, the client resource access unit 211 transfers data on the resource 108 returned from the client 1 to the program executed by the proxy-program execution unit 210.

Even when access to the resource 108 is requested from a program executed by a proxy-program execution unit 303 of the cloud 3, the client resource access unit 211 requests the resource information access unit 107 of the client 1 to access the resource 108. In addition, the client resource access unit 211 transfers data on the resource 108 returned from the client 1 to the program executed by the proxy-program execution unit 303.

The client resource access unit 211 uses a publicly known art such as a virtual resource access method in a typical virtual file system (VFS). The cloud 3 includes each unit described below.

A proxy execution environment registration unit 301 generates a virtual machine on the basis of the proxy execution environment of the client 1 transmitted from the client registration unit 201 of the proxy server 2, and records the virtual machine in a proxy execution environment management table 302.

The proxy execution environment management table 302 is used to record a registration number of the proxy execution environment, an ID of the client 1, an ID of the proxy server 2, and the proxy execution environment. FIG. 8 illustrates an example of the proxy execution environment management table 302. The proxy execution environment management table 302 stores pointer information to the virtual machine generated by the proxy execution environment registration unit 301.

The proxy-program execution unit 303 receives the memory image, the proxy execution environment, and the program transmitted from the program execution request management unit 209 of the proxy server 2. In addition, the proxy-program execution unit 303 accesses a virtual machine in a proxy execution environment through the proxy execution environment management table 302 to load the requested program and the memory image into the proxy execution environment, and executes the program. After the execution, the proxy-program execution unit 303 acquires an image after the memory is changed, and returns the image to the program execution request unit 1052 through the program execution request management unit 209.

When access to the resource 108 of the client 1 is requested from the program executed by the proxy-program execution unit 303, a client resource access unit 304 requests the client resource access unit 211 of the proxy server 2 to access the resource 108. In addition, the client resource access unit 304 transfers the resource 108 returned from the proxy server 2 to the program executed by the proxy-program execution unit 303. The information on the resource 108 is transferred through the proxy execution environment. The client resource access unit 304 uses a publicly known art such as a virtual resource access method in a typical virtual file system (VFS).

Figure 2:
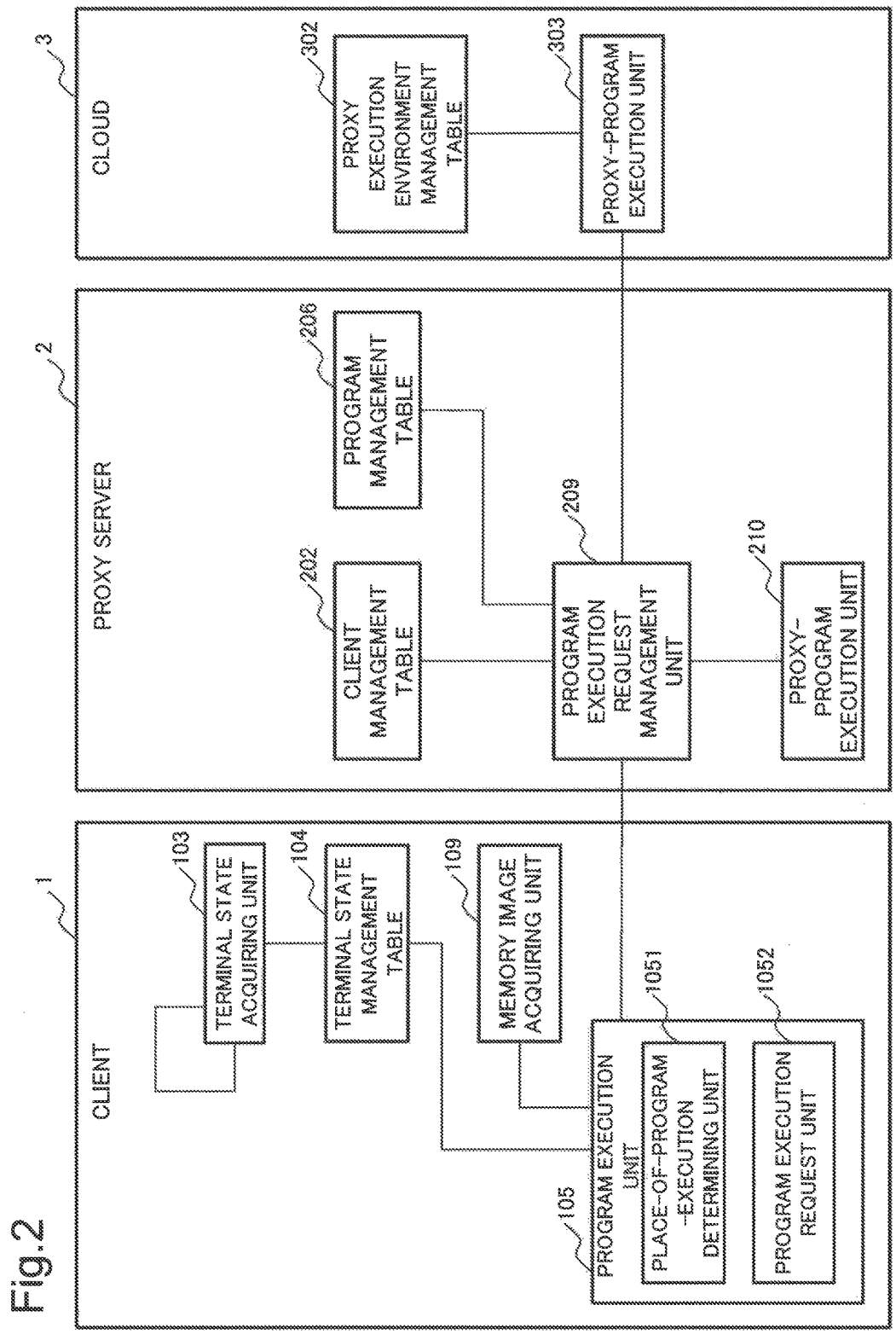
FIG. 2 illustrates a part of the relationships among each unit of a client 1, a proxy server 2, and a cloud 3.

FIG. 2 illustrates a part of the relationships among each unit of the client 1, the proxy server 2, and the cloud 3 described above.

Each of the client registration request unit 101, the program registration request unit 102, the terminal state acquiring unit 103, the program execution unit 105, the resource information access unit 107, and the memory image acquiring unit 109 of the client 1 is composed of a logic circuit. Each of these units may be realized by a program loaded into a memory (not illustrated) of the client 1 that is a computer and executed by a CPU (not illustrated). The terminal state management table 104 is provided in an area of the memory (not illustrated) of the client 1.

In the proxy server 2, each of the client registration unit 201, the program execution environment generating unit 204, the program registration unit 205, the program analysis compiling unit 207, the cloud state acquiring unit 208, the program execution request management unit 209, the proxy-program execution unit 210, and the client resource access unit 211, is composed of a logic circuit. Each of these units may be realized by a program loaded into a memory (not illustrated) of the proxy server 2 that is a computer and executed by a CPU (not illustrated). Each of the client management table 202, the cloud management table 203, and the program management table 206 is provided in an area of the memory (not illustrated) of the proxy server 2.

In the cloud 3, each of the proxy execution environment registration unit 301, the proxy-program execution unit 303, and the client resource access unit 304 is composed of a logic circuit. Each of these units may be realized by a program loaded into a memory (not illustrated) of the cloud 3 that is a computer and executed by a CPU (not illustrated).

The proxy execution environment management table 302 is provided in an area of the memory (not illustrated) of the cloud 3.

<Operation Coordination of Each Unit>

Operation coordination of each of the units described above will be described with reference to FIGS. 9 to 15.

Figure 9:
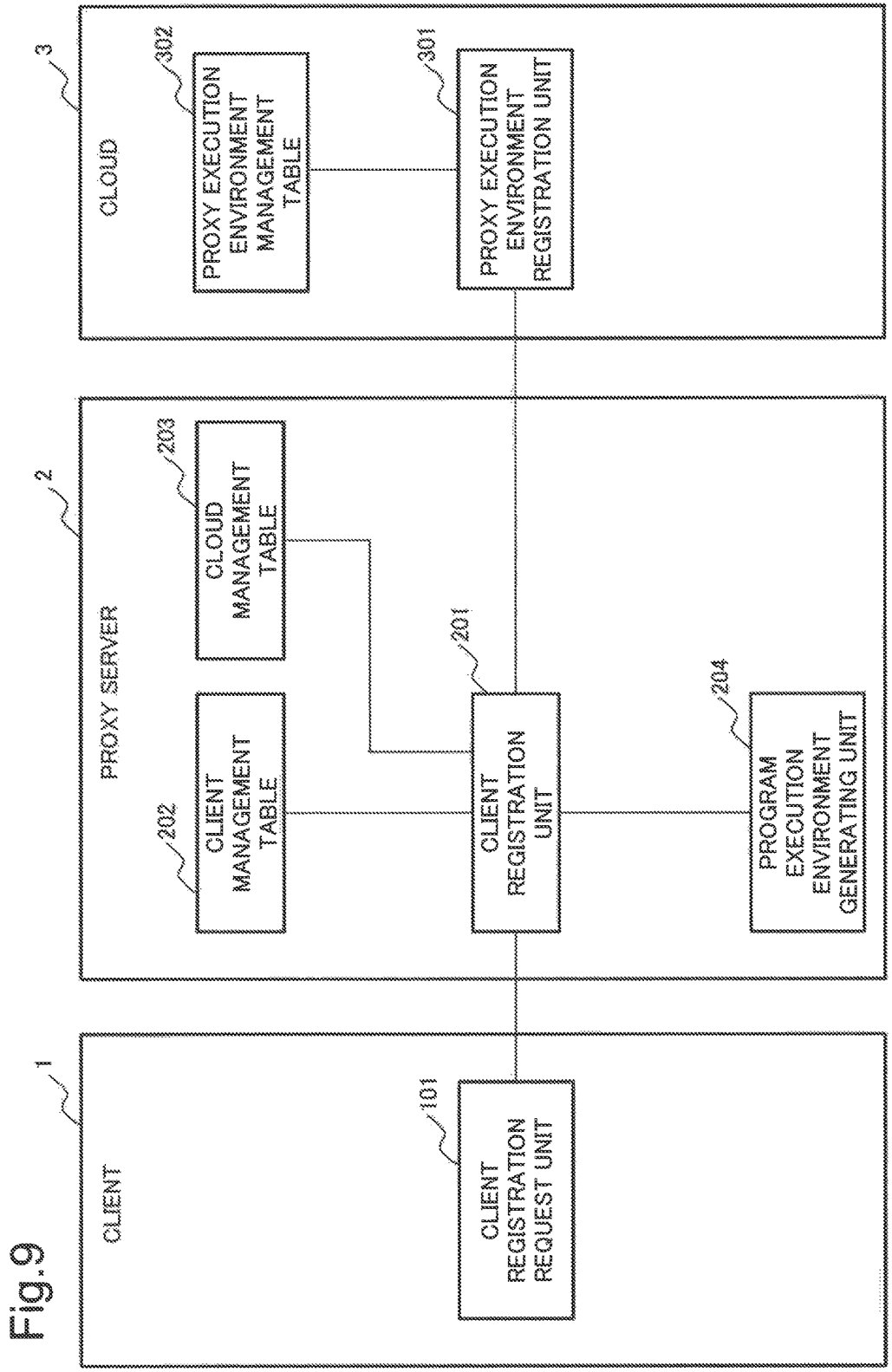
FIG. 9 illustrates units which are necessary for an operation of registration of the client 1.

FIG. 9 illustrates units which are necessary for an operation of registration of the client 1.

The client 1 transmits the own client ID and specification information to the proxy server 2 at the first connection to the proxy server 2 by using the client registration request unit 101.

The client registration unit 201 extracts the ID and the specification information of the client 1 from a client registration request transmitted from the client registration request unit 101 of the client 1, and records the ID and the specification information in the client management table 202. In addition, the client registration unit 201 registers a virtual proxy execution environment generated by the program execution environment generating unit 204 in the client management table 202, and selects one cloud 3 from the cloud management table 203 to transmit the proxy execution environment to the cloud 3.

The proxy execution environment registration unit 301 records the proxy execution environment of the client 1 transmitted from the client registration unit 201 of the proxy server 2 in the proxy execution environment management table 302.

Figure 10:
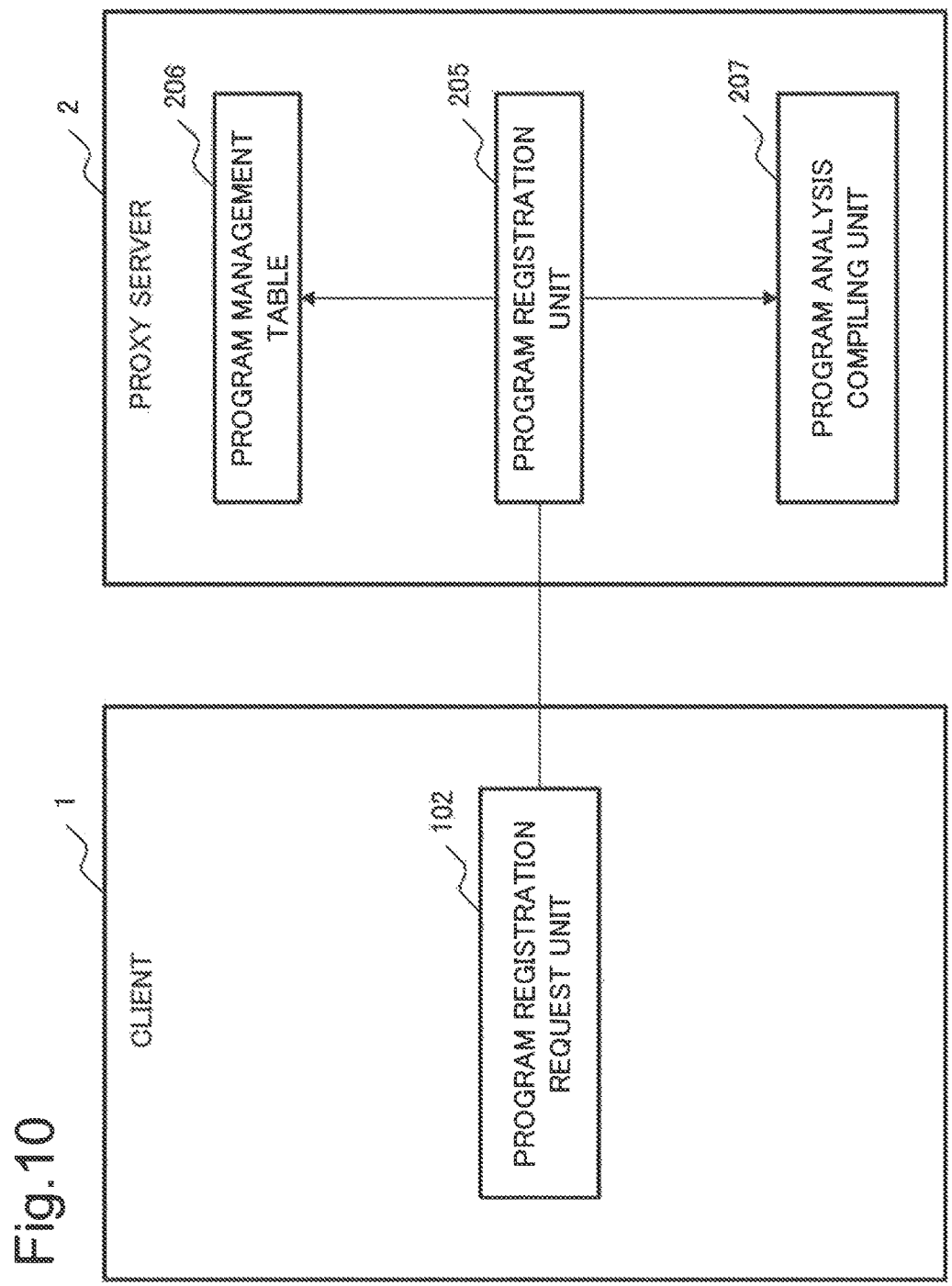
FIG. 10 illustrates units which are necessary for an operation of registration of the program.

FIG. 10 illustrates units which are necessary for an operation of registration of the program.

The program registration request unit 102 registers a program of the client 1 in the proxy server 2 at the first communication, or, when an additional program is installed, transmits a source, a binary code, or an intermediate code of the program to register the program in the proxy server 2.

The program registration unit 205 allows the program analysis compiling unit 207 to analyze an intermediate code or a binary code of the program of the client 1 which codes are transmitted from the program registration request unit 102 of the client 1, and records an analyzed result in the program management table 206. When the program transmitted is a source, the program registration unit 205 allows the program analysis compiling unit 207 to compile the source program into an intermediate language or a binary code of a common architecture of the program execution system 6.

Figure 11:
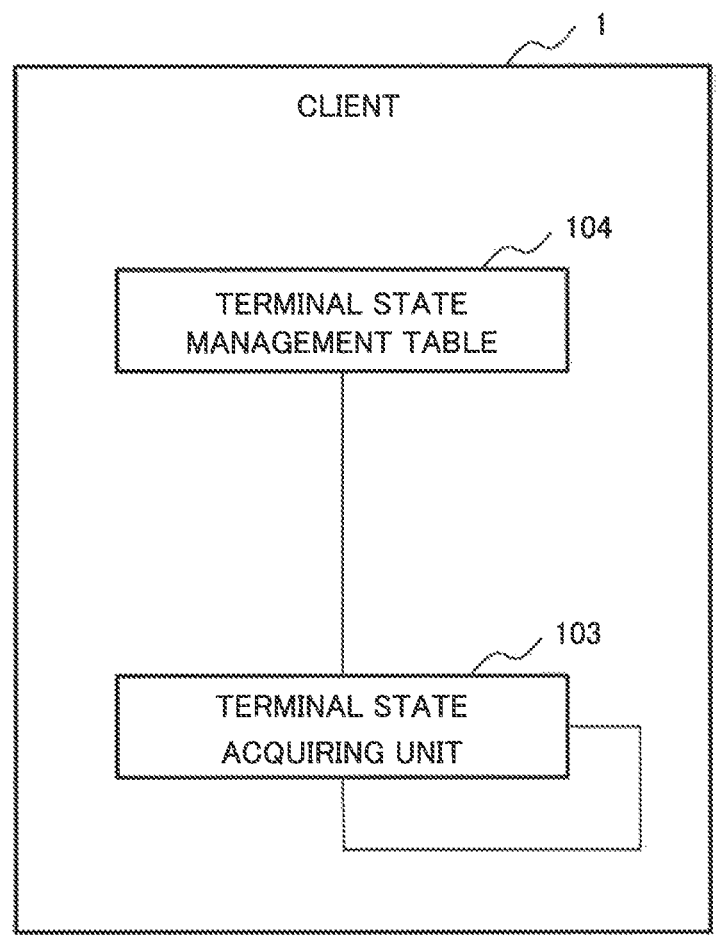
FIG. 11 illustrates units which are necessary for an operation of update of a terminal state.

FIG. 11 illustrates units which are necessary for an operation of update of a terminal state.

The terminal state acquiring unit 103 acquires terminal state information on the client 1 at regular intervals as to whether the client 1 is operating or not, whether the client 1 is worn by a user or not, whether the client 1 is moving or is stopped, and whether radio waves reach or not, and records the information in the terminal state management table 104.

Figure 12:
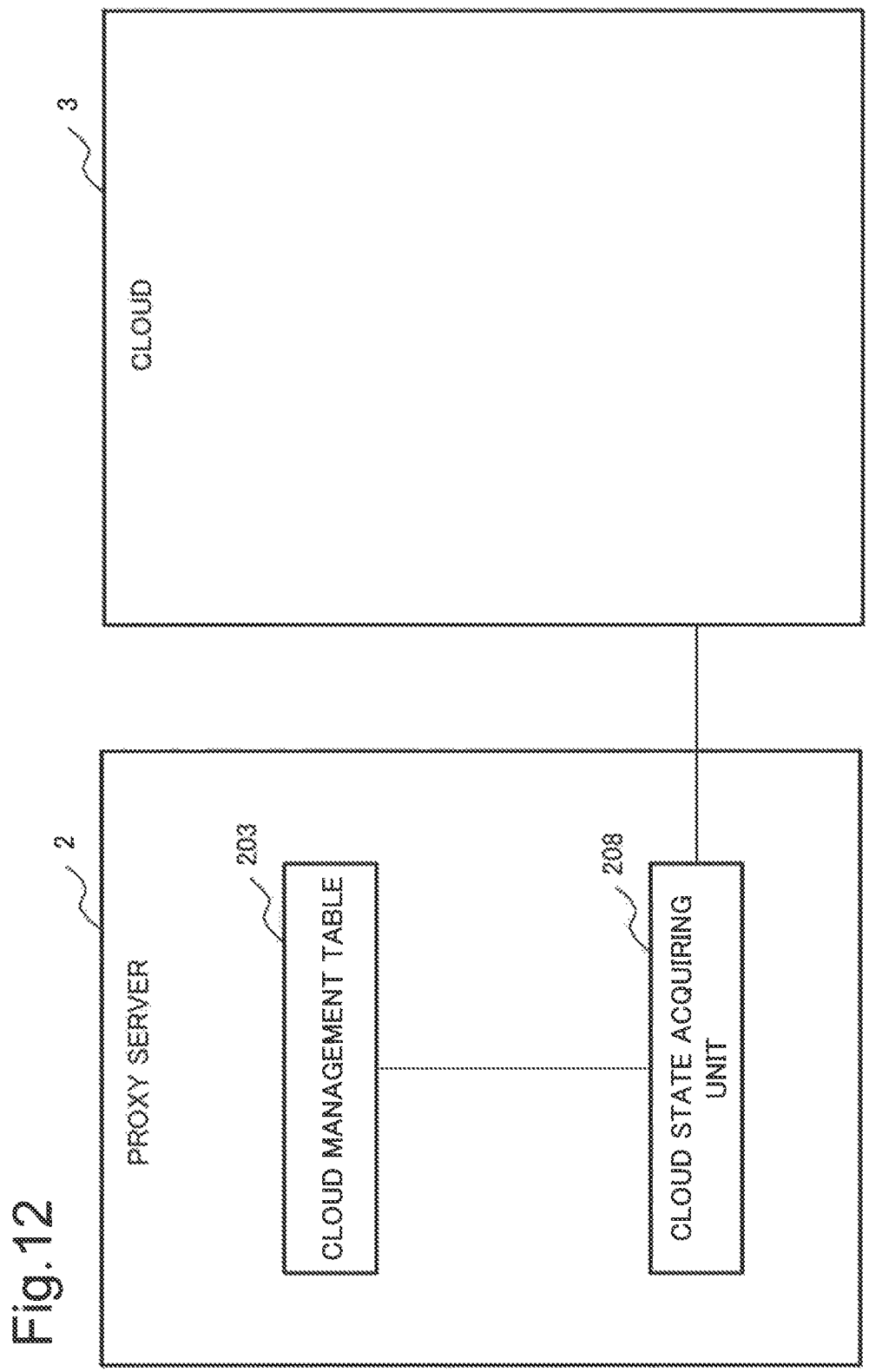
FIG. 12 illustrates units which are necessary for an operation of update of a state of the cloud 3.

FIG. 12 illustrates units which are necessary for an operation of update of a state of the cloud 3.

The cloud state acquiring unit 208 checks connection to the cloud 3 at regular intervals, and records the result in the cloud management table 203.

Figure 13:
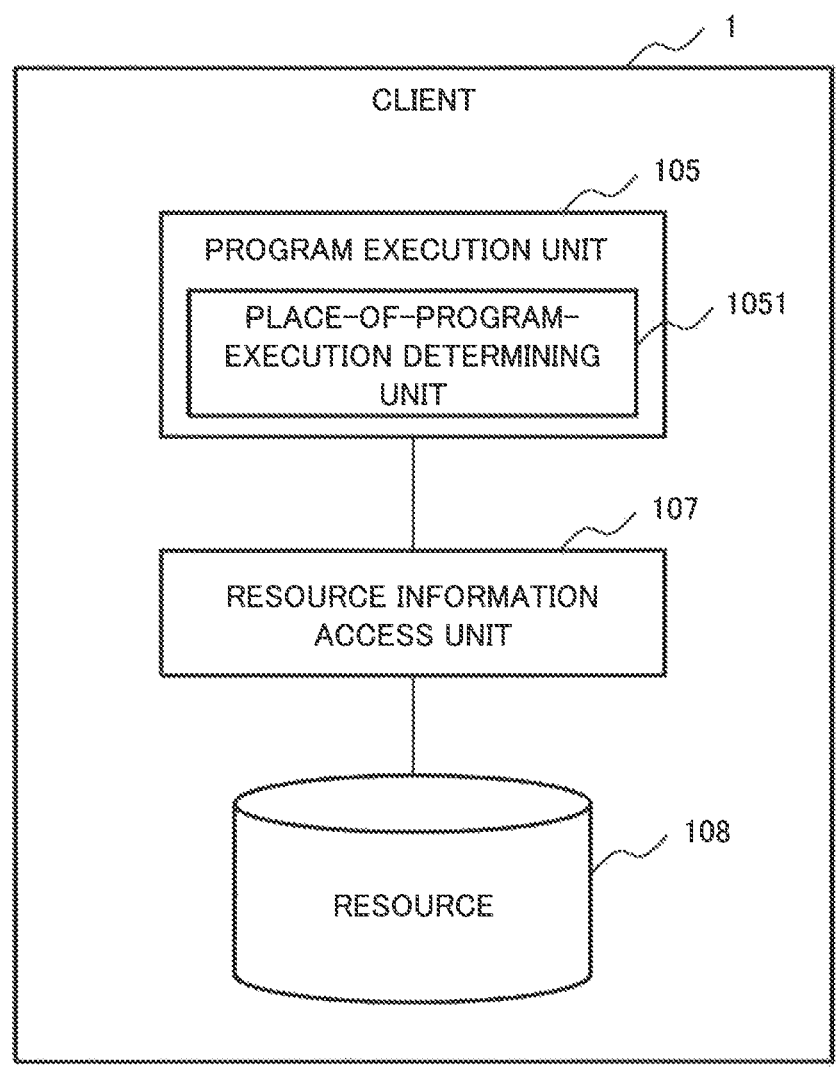
FIG. 13 illustrates units which are necessary for an operation of program execution in the client 1.

FIG. 13 illustrates units which are necessary for an operation of program execution in the client 1.

When execution of a program is requested from a user operating the client 1 or an inside process of the client 1, the program execution unit 105 executes a program determined by the place-of-program-execution determining unit 1051 to be executed by the client 1 due to a request of a high-rank response. When the program is required to access the resource 108 at the time of execution, the program accesses the resource 108 through the resource information access unit 107 to acquire information.

Figure 14:
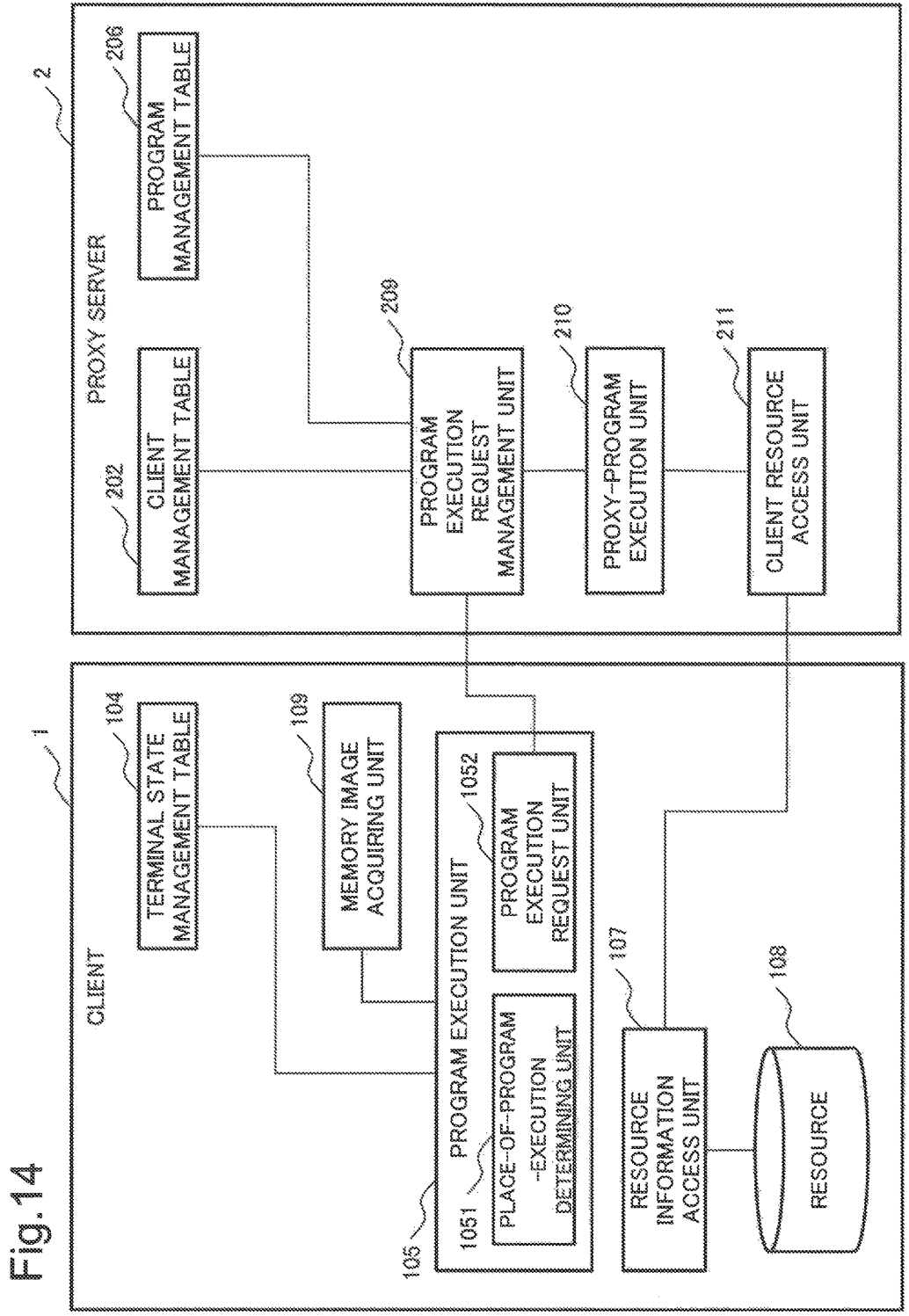
FIG. 14 illustrates units which are necessary for an operation of program execution in the proxy server 2.

FIG. 14 illustrates units which are necessary for an operation of program execution in the proxy server 2.

This is an operation performed when execution of a program is requested from a user operating the client 1 or an inside process of the client 1, and the place-of-program-execution determining unit 1051 determines that the program requests a middle-speed responsiveness. In this case, the program execution unit 105 acquires the memory image of the client 1 from the memory image acquiring unit 109, and allows the program execution request unit 1052 to transmit an execution request for the program to the proxy server 2.

The program execution request management unit 209 acquires a requested program, state information, information on a memory image, an elapsed time from the last operation if added, and the like, from the program execution request transmitted from the program execution request unit 1052 of the client 1. Subsequently, the program execution request management unit 209 acquires a proxy execution environment of the requested client 1 from the client management table 202, and acquires the requested program from the program management table 206.

The program execution request management unit 209 requests the proxy-program execution unit 210 to execute the requested program in the proxy server 2 when the state information indicates a request of a middle-speed responsiveness, and returns a memory image as a result of the execution of the program and operation information on the resource 108 to the client 1. Even when the state information indicates the request of a middle-speed responsiveness, the program execution request management unit 209 may request the proxy-program execution unit 210 to execute the requested program in the proxy server 2 as far as the elapsed time from the last operation is within a certain time.

When proxy execution of the program is requested from the program execution request management unit 209, the proxy-program execution unit 210 loads the requested program and the memory image of the client 1 into a virtual machine that is a proxy execution environment to execute the program. In addition, the proxy-program execution unit 210 acquires an image after the memory is changed to return the image to the program execution request management unit 209. When access to the resource 108 of the client 1 is required while the program is executed in the proxy execution environment, the program requests the client resource access unit 211 through the proxy execution environment to access the resource 108 of the client 1, and receives a result.

The program execution request unit 1052 develops the memory image returned from the program execution request management unit 209 in the memory of the client 1, and executes resource operation to allow the client 1 to be in a state after the program is executed.

Figure 15:
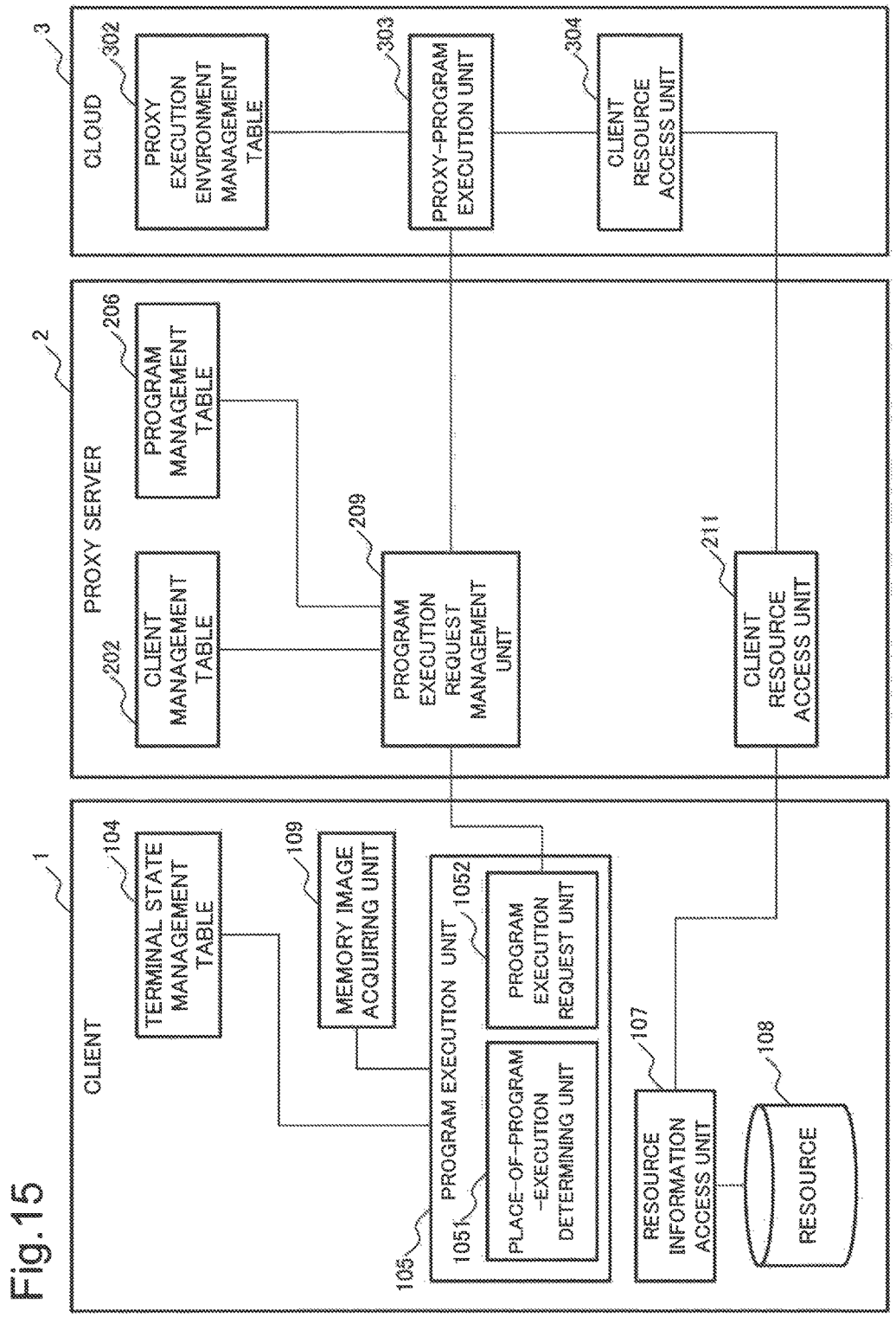
FIG. 15 illustrates units which are necessary for an operation of program execution in the cloud 3.

FIG. 15 illustrates units which are necessary for an operation of program execution in the cloud 3.

This is an operation performed when execution of a program is requested from a user operating the client 1 or an inside process of the client 1, and the place-of-program-execution determining unit 1051 determines that the program requests a middle-speed responsiveness or a low-speed responsiveness. The program execution unit 105 acquires the memory image of the client 1 from the memory image acquiring unit 109, and allows the program execution request unit 1052 to transmit an execution request for the program to the proxy server 2.

The program execution request management unit 209 acquires a requested program, state information, information on a memory image, an elapsed time from the last operation if added, and the like, from the program execution request transmitted from the program execution request unit 1052 of the client 1. Subsequently, the program execution request management unit 209 acquires a proxy execution environment of the requested client 1 from the client management table 202, and acquires the requested program from the program management table 206.

The program execution request management unit 209 requests the proxy-program execution unit 303 to execute the requested program in the cloud 3 when the state information indicates a request of a low-speed responsiveness, and returns a memory image as a result of the execution of the program and operation information on the resource 108 to the client 1. Even when the state information indicates a request of a middle-speed responsiveness, the program execution request management unit 209 may request the proxy-program execution unit 303 to execute the requested program in the cloud 3 as far as the elapsed time from the last operation is not within a certain time.

The proxy-program execution unit 303 receives the memory image, the proxy execution environment, and the requested program, transmitted from the program execution request management unit 209 of the proxy server 2. In addition, the proxy-program execution unit 303 accesses a virtual machine in a proxy execution environment through the proxy execution environment management table 302 to load the requested program and the memory image into the proxy execution environment, and executes the program. After the execution, the proxy-program execution unit 303 acquires an image after the memory is changed to return the image to the program execution request management unit 209. When access to the resource 108 of the client 1 is required while the program is executed in the proxy execution environment, the program requests the client resource access unit 304 through the proxy execution environment to access the resource 108 of the client 1, and receives a result.

When access to the resource 108 of the client 1 is requested from the program executed by the proxy-program execution unit 303, the client resource access unit 304 requests the client resource access unit 211 of the proxy server 2 to access the resource 108. In addition, the client resource access unit 304 transfers the resource 108 returned from the proxy server 2 to the program executed by the proxy-program execution unit 303.

The program execution request unit 1052 develops the memory image returned from the program execution request management unit 209 in the memory of client 1, and executes resource operation to allow the client 1 to be in a state after the program is executed.

<Effect>

The program execution system 6 according to the present invention selects a place of executing the program depending on usage of the client 1 such as a smart terminal to suppress consumption of a CPU resource and a battery of the client 1 used by a user.

The reason is that the program execution unit 105 determines the usage of the client 1 to allow the proxy server 2 or the cloud 3 to execute a program started up in a state where a high-rank response is not required.

Second Exemplary Embodiment

FIG. 16 is a block diagram of a program execution system 6 according to the present exemplary embodiment.

The program execution system 6 includes a client 1 provided with a program execution unit 105, a proxy server 2 provided with a program execution request management unit 209, and a cloud 3 provided with a proxy-program execution unit 303.

The program execution unit 105 determines whether a program started up is to be executed by the client 1 or another device on the basis of a state of the client 1. When it is determined that another device executes the program, the program execution unit 105 transmits a first execution request to which state information of the client 1 is added to the proxy server 2 connected through a near field communication 4.

The program execution request management unit 209 receives the first execution request, and determines whether the program is to be executed by the proxy server 2 or another device on the basis of the state information added. When it is determined that another device executes the program, the program execution request management unit 209 transmits a second execution request to the cloud 3 connected through a far field communication 5.

The proxy-program execution unit 303 receives the second execution request, and executes the program.

The program execution system 6 according to the present embodiment selects a place of executing the program depending on usage of the client 1 such as a smart terminal to suppress consumption of a CPU resource and a battery of the client 1 used by a user.

The reason is that the program execution unit 105 determines the usage of the client 1 to allow the proxy server 2 or the cloud 3 to execute a program started up in a state where a high-rank response is not required.

As described above, while the invention of the present application is described with reference to the exemplary embodiments, the invention of the present application is not limited to the exemplary embodiments described above. Various modifications within the scope of the invention of the present application, which can be perceived by a person skilled in the art, can be applied to the configuration and the detail of the invention of the present application.

<Hardware Configuration>

FIG. 17 illustrates, by way of example, a configuration of an information processing apparatus 500 (computer) which can implement a terminal or server relevant to an exemplary embodiment of the present invention. In other words, FIG. 17 illustrates a configuration of a computer (information processing apparatus) capable of implementing the terminal or server illustrated in FIGS. 1,2,9-16, representing a hardware environment where the individual functions in the above-described exemplary embodiments can be implemented.

The information processing apparatus 500 illustrated in FIG. 17 includes the following as components:

CPU 501 (Central_Processing_Unit);
ROM 502 (Read_Only_Memory);
RAM 503 (Random_Access_Memory);
Hard disk 504 (storage device, memory);
Drive device 507 capable of reading and writing data stored in a storage medium 506 such as CD-ROM (Compact Disc Read Only Memory);
Communication interface 508 (Interface: hereinafter called "I/F") communicable with outer network 509; and
Input/output interface 510.

The information processing apparatus 500 is a general computer where these components are connected via a bus 511 (communication line).

The present invention explained with the above-described exemplary embodiments as examples is accomplished by providing the information processing apparatus 500 illustrated in FIG. 17 with a computer program which is capable of implementing the functions illustrated in the flowcharts (FIG. 4) referenced in the explanation of these embodiments, and then by reading the computer program into the CPU 501 in such hardware, interpreting it, and executing it. The computer program provided to the apparatus can be stored in a volatile readable and writable storage memory (RAM 503) or in a non-volatile storage device such as the hard disk 504.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

REFERENCE SIGNS LIST

1 Client
2 Proxy server
3 Cloud
4 Near field communication
5 Far field communication
6 Program execution system
101 Client registration request unit
102 Program registration request unit
103 Terminal state acquiring unit
104 Terminal state management table
105 Program execution unit
107 Resource information access unit
108 Resource
109 Memory image acquiring unit
201 Client registration unit
202 Client management table
203 Cloud management table
204 Program execution environment generating unit
205 Program registration unit
206 Program management table
207 Program analysis compiling unit
209 Program execution request management unit
210 Proxy-program execution unit
211 Client resource access unit
301 Proxy execution environment registration unit
302 Proxy execution environment management table
303 Proxy-program execution unit
304 Client resource access unit
1051 Place-of-program-execution determining unit
1052 Program execution request unit

The invention claimed is:

1. A program execution system comprising:
a client device, wherein the client device includes a program execution unit, and wherein the client device includes a first one or more processors, and wherein the logic of the program execution unit is implemented by a first program executed by the first one or more processors;
a proxy server, wherein the proxy server includes an execution request management unit, and wherein the proxy server includes a second one or more processors and wherein the logic of the execution request management unit is implemented by a second program executed by the second one or more processors; and
a cloud server, wherein the cloud server includes a second proxy execution unit, and wherein the cloud server includes a third one or more processors and wherein the logic of the second proxy execution unit is implemented by a third program executed by the third one or more processors,
wherein the client device is configured to include one or more processors and each of the processors is configured to act as a program execution unit,
the proxy server is configured to include one or more processors and each of the processors is configured to act as an execution request management unit, and
the cloud server is configured to include one or more processors and each of the processors is configured to act as a second proxy execution unit,
wherein the program execution unit is configured to: i) determine whether a program started up is to be executed by the client device or the proxy server or the cloud server, based on a state of the client device, and ii) transmit a first execution request to which state information associated with the client device is added, to the proxy server connected through a near field communication when it is determined that the program started up is to be executed by the proxy server or the cloud server,
the execution request management unit is configured to: i) receive the first execution request, ii) determine whether the program started up is to be executed by the proxy server or the cloud server, based on the state information of the first execution request, and iii) transmit a second execution request to the cloud server connected through a far field communication when it is determined that the program started up is to be executed by the cloud server, and
the second proxy execution unit is configured to: i) receive the second execution request, and ii) execute the program started up.

2. The program execution system according to claim 1, wherein the program execution unit is configured to determine: i) that the program started up is to be executed by the client device when the client device is operating or cannot communicate with the proxy server through the near field communication, and ii) that the program started up is to be executed by the proxy server or the cloud server in other cases, and
the execution request management unit is configured to determine that: i) the program started up is to be executed by the proxy server when the execution request management unit determines that the client device is worn by a user or is moving, and an elapsed time from a last operation is within a predetermined time, based on the state information, and ii) in other cases, the program started up is to be executed by the proxy server or the cloud server.

3. The program execution system according to claim 1, wherein the program execution unit is configured to: i) add memory information associated with the client device to the first execution request and ii) transmit the first execution request,
wherein the proxy server further includes an execution environment generating unit, wherein the logic of the execution environment generating unit is implemented by a fourth program executed by the second one or more processors, and wherein the execution environment generating unit is configured to generate a virtual execution environment of the client device from specification information associated with the client and the memory information, and the second proxy execution unit of the cloud server executes the program started up in the virtual execution environment that is generated by the proxy server and is transmitted to the cloud server.

4. The program execution system according to claim 1, wherein the client device further comprises a resource to which the program started up requires access, and a resource information access unit configured to access the resource, and wherein the proxy server further comprises a client resource access unit, wherein the logic of the client resource access unit is implemented by a fifth program executed by the second one or more processors, and wherein the client resource access unit is configured to: i) receive an access request for allowing the program started up executing on the proxy server access to the resource of the client device, and ii) transfer the access request to the resource access unit.

5. The program execution system according to claim 2, wherein the program execution unit is further configured to: i) add memory information associated with the client device to the first execution request and ii) transmit the first execution request, and wherein the proxy server further includes an execution environment generating unit, wherein the logic of the execution environment generating unit is implemented by a sixth program executed by the second one or more processors, wherein the execution environment generating unit is configured to generate a virtual execution environment of the client device from specification information associated with the client and the memory information, and the second proxy execution unit of the cloud server is configured to execute the program started up in the virtual execution environment that is generated by the proxy server and is transmitted to the cloud server.

6. The program execution system according to claim 2, wherein the client device further includes a resource to which the program started up requires access, and a resource information access unit configured to access the resource, and wherein the proxy server further comprises a client resource access unit, wherein the logic of the client resource access unit is implemented by a seventh program executed by the second one or more processors, wherein the client resource access unit is configured to: i) receive an access request for allowing the program started up executing on the proxy server to access the resource of the client device, and ii) transfer the access request to the resource access unit.

7. The program execution system according to claim 3, wherein the client device further includes a resource to which the program started up requires access, and a resource information access unit configured to access the resource, and wherein the proxy server further comprises a client resource access unit, wherein the logic of the client resource access unit is implemented by an eighth program executed by the second one or more processors, wherein the client resource access unit is configured to: i) receive an access request for allowing the program started up executing on the proxy server to access the resource of the client device, and ii) transfer the access request to the resource access unit.

8. A method performed by a program execution system including a client device, a proxy server, and a cloud server, the method comprising:

by the client device, determining based on a state of the client device whether a program started up is to be executed by the client device or the proxy server or the cloud server, and transmitting a first execution request to which state information associated with the client device is added, to the proxy server connected through a near field communication when it is determined that the program started up is to be executed by the proxy server or the cloud server;

by the proxy server, receiving the first execution request, determining based on the state information of the first execution request whether the program started up is to be executed by the proxy server or the cloud server, and transmitting a second execution request to the cloud server connected through a far field communication when it is determined that the program started up is to be executed by the cloud server; and by the cloud server, receiving the second execution request and executing the program started up.

9. The method according to claim 8, further comprising:

by the client device, determining that the program started up is to be executed by the client device when the client device is operating or cannot communicate with the proxy server through the near field communication, and that the program is to be executed by the proxy server or the cloud server in other cases; and by the proxy server, determining based on the state information that the program started up is to be executed by the proxy server when the proxy server determines that the client device is worn by a user or is moving and an elapsed time from a last operation is within a predetermined time, and that the program is to be executed by the cloud server in other cases.

10. The method according to claim 8, further comprising:

by the client device, adding memory information of the client device to the first execution request and transmitting the first execution request;

by the proxy server, generating a virtual execution environment of the client from specification information of the client device and the memory information; and by the cloud server, executing the program started up in the virtual execution environment that is generated by the proxy server and is transmitted to the cloud server.

11. The method according to claim 8, wherein the client device further includes a resource to which the program started up requires access, the method further comprising:

by the proxy server, receiving an access request to the resource of the client device from the program started up to be executed by the proxy server, and transferring the access request to the client device.

12. The method according to claim 9, further comprising:

by the client device, adding memory information of the client device to the first execution request and transmitting the first execution request;

by the proxy server, generating a virtual execution environment of the client from specification information of the client device and the memory information; and by the cloud server, executing the program started up in the virtual execution environment that is generated by the proxy server and is transmitted to the cloud server.

13. The method of executing a program according to claim 9,
wherein the client device further includes a resource to which the program started up requires access, and further comprising:
by the proxy server, receiving an access request to the resource of the client device from the program started up executing on the proxy server, and transferring the access request to the client device.

14. The method according to claim 10,
wherein the client device further includes a resource to which the program started up requires access, and further comprising:
by the proxy server, receiving an access request to the resource of the client device from the program started up executing on the proxy server, and transferring the access request to the client device.

15. A non-transitory computer-readable storage medium for recording program code, the program code comprising:
first program code configured to cause a first computer comprising first one or more processors to execute first steps comprising: determining based on a state of the first computer whether a program started up is to be executed by the first computer, a second computer or a third computer, and transmitting a first execution request to which state information associated with the first computer is added, to the second computer connected through a near field communication when it is determined that the program started up is to be executed by the second computer or the third computer, wherein the second computer includes a proxy server;
second program code configured to cause the second computer to execute second steps comprising: receiving the first execution request, determining based on the added state information whether the program started up is to be executed by the second computer or the third computer, and transmitting a second execution request to the third computer connected through a far field communication when it is determined that the program is to be executed by the third computer; and
third program code that causes the third computer to execute steps comprising: receiving the second execution request, and executing the program started up.

16. The non-transitory storage medium according to claim 15,
wherein the first program code causes the first computer to execute the program started up when the first computer is operating or cannot communicate with the second computer through the near field communication, and wherein the first program code causes the first computer to determine that the program is to be executed by the second computer or the third computer in other cases, and the second program code causes the second computer to execute the program started up when it is determined based on the state information that the first computer is worn by a user or is moving and an elapsed time from a last operation is within a predetermined time, and wherein the second program code causes the second computer to determine that the program started up is to be executed by the third computer in other cases.

17. The non-transitory storage medium according to claim 15,
wherein the first program code is configured to cause the first computer to: i) add memory information associated with the client device to the first execution request and ii) transmit the first execution request,
the second program code is configured to cause the second computer to generate a virtual execution environment of the client from specification information of the client device and the memory information, and
the third program code is configured to cause the third computer to execute the program started up in the virtual execution environment that is generated by the proxy server and is transmitted to the third computer.

18. The non-transitory storage medium according to claim 15,
wherein the first computer further includes a resource to which the program started up requires access, and
wherein the second computer code is configured to cause the second computer to: i) receive an access request to the resource of the first computer from the program started up executing on the second computer, and ii) transfer the access request to the first computer.

19. The non-transitory storage medium according to claim 16,
wherein the first program code is configured to cause the first computer to: i) add memory information associated with the client device to the first execution request and ii) transmit the first execution request,
the second program code is configured to cause the second computer to generate a virtual execution environment of the client from specification information of the client device and the memory information, and
the third program is configured to cause the third computer to execute the program started up in the virtual execution environment that is generated by the proxy server and is transmitted to the third computer.

20. The non-transitory storage medium according to claim 16,
wherein the first computer further includes a resource to which the program started up requires to access and accesses the resource, and
wherein the second computer code is further configured to cause the second computer to: i) receive an access request to the resource from the program started up executing on the second computer, and ii) transfer the access request to the first computer.

* * * * *